US008021705B1

(12) United States Patent
Lang et al.

(10) Patent No.: US 8,021,705 B1

(45) **Date of Patent: *Sep. 20, 2011**

(54) DRY MIXES COMPRISING GLYCERINE

(75) Inventors: Kevin W. Lang, Lloyd Neck, NY (US); James W. Dibble, Port Jefferson, NY (US)

(73) Assignee: Delavau LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/710,118

(22) Filed: Feb. 22, 2010

Related U.S. Application Data

(63) Continuation of application No. 12/392,973, filed on Feb. 25, 2009, now Pat. No. 7,666,457.

(60) Provisional application No. 61/090,145, filed on Aug. 19, 2008.

(51) Int. Cl.
*A21D 10/00* (2006.01)

(52) U.S. Cl. ......... 426/555; 426/302; 426/307; 426/622

(58) Field of Classification Search ........................ None
See application file for complete search history.

(56) References Cited

U.S. PATENT DOCUMENTS

| | | | | |
|---|---|---|---|---|
| RE3,850 | E | | 2/1870 | Letchworth |
| 1,167,133 | A | | 1/1916 | Tierney |
| 1,680,898 | A | | 8/1928 | Jean Matti |
| 2,401,259 | A | | 5/1946 | Lloyd et al. |
| 2,615,810 | A | | 10/1952 | Stone |
| 3,216,829 | A | | 11/1965 | Hansen |
| 3,481,745 | A | | 12/1969 | Borer et al. |
| 3,492,127 | A | | 1/1970 | Ketch et al. |
| 4,291,065 | A | | 9/1981 | Zobel et al. |
| 4,299,848 | A | | 11/1981 | De Stefanis et al. |
| 4,341,809 | A | | 7/1982 | Leshik et al. |
| 4,511,585 | A | | 4/1985 | Durst |
| 4,598,048 | A | | 7/1986 | Diderichsen et al. |
| 4,604,355 | A | | 8/1986 | Outtrup |
| 4,654,216 | A | | 3/1987 | Carroll et al. |
| 4,663,168 | A | | 5/1987 | Von Fulger et al. |
| 4,803,084 | A | | 2/1989 | Shine |
| 5,023,099 | A | | 6/1991 | Boehm |
| 5,059,430 | A | | 10/1991 | Bowles |
| 5,133,984 | A | | 7/1992 | Murphy et al. |
| 5,147,665 | A | | 9/1992 | Furcsik |
| 5,209,938 | A | | 5/1993 | Kraus et al. |
| 5,336,515 | A | | 8/1994 | Murphy et al. |
| 5,344,664 | A | | 9/1994 | Fitch et al. |
| 5,360,623 | A | * | 11/1994 | Thorson et al. ............... 426/555 |
| 5,403,610 | A | | 4/1995 | Murphy et al. |
| 5,409,717 | A | | 4/1995 | Apicella et al. |
| 5,472,724 | A | | 12/1995 | Williams et al. |
| 5,648,110 | A | | 7/1997 | Wu et al. |
| 5,738,900 | A | * | 4/1998 | Cuadrado et al. ............. 426/658 |
| 6,007,858 | A | | 12/1999 | Gum et al. |
| 6,197,352 | B1 | | 3/2001 | Olesen |
| 6,251,458 | B1 | | 6/2001 | Weibel |
| 6,261,625 | B1 | | 7/2001 | Pickford |
| 6,365,204 | B1 | | 4/2002 | Spendler et al. |
| 6,432,459 | B1 | | 8/2002 | Bel Rhlid et al. |
| 6,461,649 | B1 | | 10/2002 | Ogisu et al. |
| 6,564,699 | B1 | | 5/2003 | Vincente et al. |
| 6,635,289 | B2 | | 10/2003 | Horn |
| 6,830,770 | B1 | | 12/2004 | Kilibwa |
| 6,919,098 | B2 | | 7/2005 | Ratka |
| 6,923,994 | B2 | | 8/2005 | Sturkenboom et al. |
| 6,936,289 | B2 | | 8/2005 | Olsen et al. |
| 7,166,453 | B2 | | 1/2007 | Kragh et al. |
| 7,189,552 | B2 | | 3/2007 | Lan et al. |
| 7,264,835 | B2 | | 9/2007 | Funk |
| 7,666,457 | B1 | | 2/2010 | Lang et al. |
| 7,666,633 | B2 | | 2/2010 | Callen et al. |
| 2003/0072862 | A1 | | 4/2003 | Pruden et al. |
| 2003/0077356 | A1 | | 4/2003 | Campbell et al. |
| 2004/0022407 | A1 | | 2/2004 | Steere et al. |
| 2004/0028782 | A1 | | 2/2004 | Jahnke |
| 2004/0156980 | A1 | | 8/2004 | Fleury Rey et al. |
| 2005/0202143 | A1 | | 9/2005 | Roy et al. |
| 2006/0045954 | A1 | | 3/2006 | Young et al. |
| 2006/0182853 | A1 | | 8/2006 | Kawai et al. |
| 2006/0222740 | A1 | | 10/2006 | Kao et al. |
| 2007/0092602 | A1 | | 4/2007 | Degre et al. |
| 2007/0098866 | A1 | | 5/2007 | Waller et al. |
| 2007/0172567 | A1 | | 7/2007 | Veldhuizen et al. |

(Continued)

FOREIGN PATENT DOCUMENTS

| | | |
|---|---|---|
| CA | 2061443 | 8/1993 |

(Continued)

OTHER PUBLICATIONS

Baik, M.Y., et al,, "Effects of glycerol and moisture gradient on thermomechanical properties of white bread," Journal of Agricultural and Food Chemistry, Aug. 2001, vol. 49, No. 8, pp. 4031-4038. Baik, M.Y., et al., "Effects of glycerol and moisture redistribution on mechanical properties of white bread," Cereal Chemistry, May-Jun. 2002, vol. 79, No. 3, pp. 376-382.

Baik, M.Y., et al, "Water self-diffusion coefficient and staling of white bread as affected by glycerol," Cereal Chemistry, Nov.-Dec. 2003, vol. 80, No. 6, pp. 740-744.

A.H. Barrett et al., "Effect of Different Enzymes on the Textural Stability of Shelf-Stable Bread," *Cereal Chem.* 82(2):152-157 (2005).

Barrett, A.H., et al., "Textural optimization of shelf-stable bread: effects of glycerol content and dough-forming techniques," Cereal Chemistry, Mar.-Apr. 2000, vol. 77, No. 2, pp. 169-176.

Galai, A.M. et al., "Effect of pectin and glycerol on bread staling," Baker's Digest, Dec. 1976, vol. 50, No. 6, pp. 20-22.

Guy, Robin C. E. et al., "Recent Advances in Enzymes in Grain Processing," Proceedings of the European Symposium on Enzymes in Grain Processing, 3rd], Leuven, Belgium, Sep. 25-27, 2002 (2003), pp. 287-293.

(Continued)

*Primary Examiner* — Lien Tran

(74) *Attorney, Agent, or Firm* — Jonathan D. Ball; King & Spalding LLP

(57) ABSTRACT

Dry mixes for forming dough and batters are provided comprising homogenous dispersions of glycerine on one or more ingredients in particulate form. The dry mixes are rendered more resistant to microbial growth due to the presence of glycerine. Food products prepared from the dry mixes exhibit several benefits including improved moisture retention and/or increased shelf-life.

20 Claims, No Drawings

U.S. PATENT DOCUMENTS

| | | | |
|---|---|---|---|
| 2007/0184177 | A1 | 8/2007 | Harrison et al. |
| 2008/0032350 | A1 | 2/2008 | Kubota et al. |
| 2008/0124427 | A1 | 5/2008 | Schafe et al. |
| 2008/0181984 | A1 | 7/2008 | Domingues et al. |
| 2008/0274531 | A1 | 11/2008 | Berg et al. |
| 2010/0003366 | A1 | 1/2010 | Cuevas et al. |
| 2010/0021587 | A1 | 1/2010 | Chang et al. |

FOREIGN PATENT DOCUMENTS

| | | |
|---|---|---|
| EP | 1331850 | 8/2003 |
| GB | 1 276 693 | 6/1972 |
| JP | 59224658 | 12/1984 |
| JP | 2004329019 | 11/2004 |
| JP | 2007236269 | 9/2007 |
| WO | WO 92/11376 | 7/1992 |
| WO | WO 01/67889 | 9/2001 |

OTHER PUBLICATIONS

Hegazy, Nefisa A., et al., "Effect of glycerol and pectin on balady bread freshness," Bulletin of the National Research Centre (Egypt), 1996, vol. 21, Issue 2, pp. 149-160.

Kaletunc, Gonul et al.; "The evaluation of the effect of crumb density, glycerol, and enzyme addition on the staling of bread using differential scanning calorimeter," Proceedings of the NATAS Annual Conference on Thermal Analysis and Applications, 2004, 32nd, 137.07.079/1-137.07.079/10.

Leffingwell, G. et al., "Glycerine," Baker's Digest, 1944, vol. 18, No. 5, pp. 118-119.

Leffingwell, G. et al., "Glycerine in Modern Baking Practice," Baker's Digest, 1940, vol. 14, No. 12, pp. 228-229.

Maes, E., "Effect of glycerol on some properties of bread. Original Title: Influence de la glycerine sur quelques proprietes du pain," Bull Ecole Meunerie Beige, 1951. vol. 13, No. 5, pp. 109-116.

Pyler, E.J. (editor), Baking: Science and Technology, vol. 1, 1973 (corrected printing 1982), Siebel Publishing Company, pp. 80-82.

Su, Dongmin et al., "Effects of glycerol on quality and storing characteristics of wheat bread," Henan Gongye Daxue Xuebao, Ziran Kexueban, 2007,vol. 28, No. 3, pp. 1-4.

Office Action dated Oct. 18, 2010, for U.S. Appl. No. 12/186,824, filed Aug. 6, 2008.

Office Action dated Jul. 14, 2009, for U.S. Appl. No. 12/392,973, filed Feb. 25, 2009.

Office Action dated Dec. 17, 2010, for U.S. Appl. No. 12/856,501, filed Aug. 13, 2010.

Office Action dated Feb. 28, 2011, for U.S. Appl. No. 12/938,998, filed Nov. 3, 2010.

Office Action dated Mar. 30, 2011, for U.S. Appl. No. 12/856,501, filed Aug. 13, 2010.

Office Action dated Mar. 22, 2011, for U.S. Appl. No. 12/186,824, filed Aug. 6, 2008.

U.S. Appl. No. 12/186,824, filed Aug. 6, 2008, Lang et al.

U.S. Appl. No. 12/543,897, filed Aug. 19, 2009, Lang et al.

U.S. Appl. No. 12/856,501, filed Aug. 13, 2010, Lang et al.

U.S. Appl. No. 12/938,998, filed Nov. 3, 2010, Lang et al.

* cited by examiner

DRY MIXES COMPRISING GLYCERINE

This application claims priority as a continuation under 35 U.S.C. §120 to U.S. patent application Ser. No. 12/392,973, filed Feb. 25, 2009, now U.S. Pat. No. 7,666,457, which claims benefit of priority to U.S. Provisional Application 61/090,145 filed Aug. 19, 2008, the contents of which are hereby incorporated by reference in their entirety.

FIELD OF THE INVENTION

The present invention relates generally to compositions comprising solid food ingredients in particulate form having glycerine homogenously dispersed thereon which are useful for making edible products having improved organoleptic attributes and/or shelf life. In particular, the invention relates to flour-containing dry mixes having glycerine homogenously dispersed thereon which are capable of forming batters and doughs when combined with water, which dry mixes exhibit superior resistance to microbial growth and which batters and doughs, when cooked, provide bread products having increased moisture, improved moisture retention, increased shelf life, and/or improved resistance to staling.

BACKGROUND OF THE INVENTION

The staling of bread is an important issue in the baking industry because it imposes sharp limitations on the shelf life of bread products. To mitigate the impact of staling, special storage and packaging of bread is typically employed, which is costly and can be unattractive to the consumer. Such measures provide moderate improvement in shelf life, but even under optimal storage conditions, such as sealing the bread in a high humidity environment, most bread will begin to stale after only a few days. Improved packaging cannot eliminate staling.

Further, special packaging is not possible for the segment of the industry that desires to offer unpackaged products, including, for example, smaller bakeries which market "fresh baked" products, donut shops which offer their products on racks or the like, as well as retail grocery stores which are increasingly exploiting the market for unpackaged baked goods, such as bread loafs, muffins, bagels, donuts, and cookies. Often, the shelf life of unpackaged bread products is measured in hours and the entire inventory must be discarded and replaced with fresh product one or more times throughout the day. The value of discarded bread products in the United States exceeds $1 billion annually. Therefore, preventing or slowing the staling of bread products will provide a significant economic advantage.

Staling is a complex process involving numerous chemical and physical changes in the bread which have deleterious effects on the taste, texture, aroma, crumb structure, and mouthfeel of the product. While several models have been proposed to explain staling, it may be generally said to arise as a result of starch retrogradation, water loss from the bread, and water migration within the bread.

Water provides the moist mouthfeel characteristic of fresh bread and the loss of even small amounts of water, on the order of 1 or 2 percent, through evaporation has a pronounced negative impact on bread quality and shelf life. Staling may occur even in the absence of net water loss, not only due to starch retrogradation, but also as a result of water migration within the bread. Bread comprises numerous components, such as starch, sugar, fiber, and protein, each of which has a certain affinity for water. In freshly prepared bread, an initial equilibrium condition is established between the available water and each of these components, based in part on their relative binding energies with water molecules. During storage, the equilibrium is perturbed by water loss from the bread and chemical and physical changes within the bread. For example, starch retrogradation profoundly alters the moisture equilibrium, as free water will migrate to the crystalline domains of retrograded starch, where it is tightly held and unavailable to other bread components. Consequently, the starch-gluten network becomes more rigid as less free water is available to act as a plasticizer, resulting in a firmer, less soft crumb.

It is generally not possible to increase the moisture content of bread simply by adding more water to the dough because the dough becomes sticky and unworkable.

Glycerine, also called glycerin or glycerol, is a sweet, colorless, syrupy liquid which is miscible with water. It is generally known to include glycerine in baked goods to improve flavor, texture, color and to increase moistness. See Leffingwell, Georgia and Lesser, Milton A., "Glycerine in Modern Baking Practice," *The Bakers Digest*, Vol. XIV, No. 12, June 1940, pp. 228-229, the disclosure of which is hereby incorporated by reference. Leffingwell and Lesser state that "the most important property of glycerine, however, is its natural hygroscopicity, and through this ability to retain and attract moisture is widely employed to maintain the essential freshness of breads and cakes."

In conventional practice, glycerine is incorporated in baked goods at the bowl stage, by which is meant the stage of the dough making process where the solid ingredients are charged into a mixing bowl and water, along with other liquid ingredients, is added. Thus, a precise amount of liquid glycerine must be weighed and transferred to the bowl, a process made difficult or inconvenient by its sticky nature. It is generally preferred in the baking industry, particularly for production on a commercial scale, to handle dry as opposed to liquid ingredients. However, at present, there is not believed to exist a more convenient method of delivering glycerine in the dough making process. What are lacking are compositions for handling, transporting, storing, and using glycerine in a convenient dry, solid form.

The foregoing discussion is presented solely to provide a better understanding of nature of the problem confronting the art and should not be construed in any way as an admission as to prior art nor should the citation of any reference herein be construed as an admission that such reference constitutes "prior art" to the instant application.

SUMMARY OF THE INVENTION

It has surprisingly been found that glycerine can be added to dry mixes without disrupting the useful flow and handling properties of such dry mixes. Thus, dry mixes can serve as a vehicle for introducing glycerine into foods, including without limitation, cereal products such as leavened or unleavened bread products, rather than having to separately add glycerine at the bowl stage of the dough or batter-making process.

In one aspect, the invention provides a process for preparing a dry mix for donuts comprising spraying an atomized liquid comprising glycerine through a pressurized nozzle onto an agitated mass of donut ingredients in powdered or granular form to form a dry mix having from 0.5% to about 2.5% by weight glycerine homogeneously dispersed thereon. The dry mix will typically comprise two or more donut ingredients and often will comprise from 40% to 90% by weight flour. The sprayed liquid typically has a water activity ($a_w$) less than 0.35 and typically comprises at least 50% by weight glycerine, from 0% to less than 5% by weight of an emulsifier, and optionally a flavorant component. The resulting dry mix typically has a moisture content less than 15% by weight and a water activity of less than 0.91. The flow properties and resistance to clumping of the dry mix are ideally substantially the same as the flow properties and resistance to clumping of an otherwise identical dry mix in the absence of said glycerine.

In another aspect, a process for preparing a dry mix for donuts is provided comprising a first step of spraying an atomized liquid comprising glycerine through a pressurized nozzle onto an agitated mass of donut ingredients in powdered or granular form to homogeneously disperse glycerine thereon. The powdered or granular donut ingredients will usually comprise two or more such powdered or granular ingredients. The liquid typically has a water activity ($a_w$) less than 0.35 and typically comprises at least 50% by weight glycerine, from 0% to less than 5% by weight of an emulsifier, and optionally a flavorant component. A dry mix is formed in a second step by combining the donut ingredients having glycerine homogeneously dispersed thereon with an amount of flour sufficient to bring the total flour content of the dry mix to 40% to 90% by weight of the dry mix, and the glycerine content from about 0.5% to about 2.5% by weight of the dry mix. The dry mix will usually have a moisture content less than 15% by weight and a water activity of less than 0.91. Ideally, the flow properties and resistance to clumping of the dry mix will be substantially the same as the flow properties and resistance to clumping of an otherwise identical dry mix in the absence of said glycerine.

The process may further comprise the step of transferring the dry mix to a sealed container that is substantially impervious to air.

These and other aspects of the invention will be better understood by reading the following detailed description and appended claims.

DETAILED DESCRIPTION

All terms used herein are intended to have their ordinary meaning in the art unless otherwise provided. All concentrations are in terms of percentage by weight of the specified component relative to the entire weight of the dry mix, unless otherwise specified. Unless otherwise defined, the phrase "substantially free" refers to an amount of a component that is sufficiently low such that the component contributes no significant properties to the bulk.

Glycerine is the molecule 1,2,3-trihydroxypropane and is synonymously called glycerin or glycerol, but as used herein does not include derivatives of glycerine, including for example glycerides, unless otherwise specified.

The term "particulate" refers to a solid, preferably a solid at room temperature (~21° C.), which exists in powdered form, granular form, or both. By powder is generally meant particles having an average diameter less than 1000 microns. By granular is generally meant particles having an average diameter equal to or greater than 1000 microns. In some, but not all embodiments, it may be preferred not to use particles having an average diameter greater than about 1000 microns depending on the solubility of the particle and the desired texture of the food. In one embodiment, the median particle size of some or all of the particulate components of the dry mix is less than 3 millimeters, alternatively less than 2 millimeters, alternatively less than 1 millimeter. In one embodiment, the median particle size of some or all of the particulate ingredients will be less than 500 microns or less than about 350 microns. Moreover, in other embodiments, at least 50%, 60%, 70%, 80%, 90%, 95%, or 99% of the dry mix passes through a mesh of U.S. Sieve Size 5, 6, 7, 8, 10, 12, 14, 16, 18, 20, 25, 30, 35, 40, 45, 50, or 60, each being considered to be a separate embodiment of the invention. For example, in one embodiment, at least 90%, 95%, or at least 99% of the dry mix passes through U.S. Sieve Size 20.

The invention generally provides dry mixes suitable for human consumption, useful in food preparation, comprising one or more solid food ingredients in particulate form, having glycerine homogenously dispersed thereon. The term "dry mix" as used herein refers to a free-flowing particulate (powdered and/or granular) composition consisting of ingredients suitable for human consumption. The dry mixes according to the invention are preferably neither frozen nor freeze-dried.

The dry mixes comprise one or more, two or more, or three or more food ingredients in particulate form, by which is meant that the food ingredient exists as a powdered and/or granular solid prior to the addition of any non-solid (e.g., liquid or semi-solid) components such as, for example, oils, fats, syrups (e.g., glycerine, HFCS, etc.), or the like. Typically, the particulate food ingredients will collectively comprise from about 75% by weight up to about 97%, 98%, 99%, or about 99.9% by weight of the total dry mix, but more often will comprise from at least about 80%, at least about 85%, at least about 90%, or at least about 95% by weight of the dry mix. In some embodiments, the particulate food ingredients may comprise at least about 90%, 91%, 92%, 93%, 94%, 95%, 96%, 97%, 98%, or at least about 99% by weight of the dry mix. The collective weight of all non-solid (e.g., liquid or semi-solid) ingredients, inclusive of glycerine, will typically, but not necessarily, be less than about 25% by weight, less than about 20% by weight, less than about 15% by weight, or less than about 10% by weight of the entire dry mix, including embodiments where such non-solid ingredients comprise less than about 9%, 8%, 7%, 6%, 5%, 4%, 3%, 2%, or less than about 1% by weight of the total dry mix. What is important is that the relative content of solid ingredients and non-solid ingredients is such that the entire dry mix exists as a particulate solid or otherwise behaves substantially as a particulate solid, by which is meant that it is free-flowing.

Preferred dry mixes are those that are capable of forming dough when combined with a suitable amount of water, and in particular those that comprise flour. However, dry mixes that have only minor amounts of flour or are free of flour are also within the scope of the invention. Such mixes will typically comprise solid food ingredients other than flour, such as sugar (e.g., sucrose, dextrose, fructose, etc.), starch, dietary fiber (e.g., cellulose), protein (e.g., gluten), and the like, having glycerine homogenously dispersed thereon. In some embodiments, the sugar, starch, fiber, and/or protein comprise, on a weight basis, a majority of the dry mix. In other embodiments, the dry mix will comprise a major portion of flour and sugar, starch, fiber, and/or protein will comprise, on a weight basis, a majority of the remainder.

The water content of the dry mix is preferably kept below the product-specific critical point above which clumping or caking occurs. A dry mix will usually have a moisture (water) content of less than about 15% by weight and preferably less than about 14% by weight based on the total weight of the dry mix. In other embodiments, the dry mix will have a maximum moisture content of about 13% by weight, about 12.5% by weight, about 12% by weight, about 11% by weight, about 10% by weight, about 9% by weight, or about 8% by weight. The water content may be determined by any suitable method but is preferably measured by an oven drying or vacuum oven drying method such as AACC method 44-15A, which is hereby incorporated by reference herein.

The water activity ($a_w$) of the dry mix is preferably suitably low to retard or prevent microbial growth, including mold, yeast, and/or bacteria growth. In various embodiments, the dry mixes will have an $a_w$ value measured at 21° C. of less than 0.95, less than 0.91, less than 0.87, less than 0.85, less than 0.80, less than 0.75, less than 0.70, less than 0.65, less than 0.6, or less than 0.5. The water activity of the dry mix may be measured by any suitable method, but is preferably measured using a chilled-mirror dewpoint instrument, such as an AquaLab™ 3 water activity meter from Decagon Devices (Wash., USA).

In one embodiment, the dry mixes according to the invention comprise flour and glycerin. These dry mixes are useful for preparing flour-containing food products, in particular bread products, having improved organoleptic attributes, such as aroma, taste, texture, mouthfeel and the like, improved physical properties, including crumb structure/firmness, loaf volume, loaf resiliency, etc., and/or improved storage stability, including resistance to staling and moisture loss, as compared to otherwise identical food products prepared in the absence of glycerine. In particular, both leavened and unleavened bread products prepared from the dry mixes according to the invention will exhibit improved organoleptic attributes, moisture content/retention, and/or resistance to staling, particularly on storage for an extended period of time. As a collateral benefit, the dry mixes will exhibit improved resistance to microbial growth as compared to otherwise identical dry mixes that do not comprise glycerine.

The dry mixes according to the invention will typically comprise from about 10% to about 99.9% by weight flour, an amount of glycerine effective to provide a measurable benefit but not impair the free-flowing properties of the dry mix, with any remainder comprising additional ingredients (the majority of which, on a weight basis, are preferably in particulate form) suitable for inclusion in a food product, the glycerine being homogenously dispersed on the flour and/or on part or all of the optional additional ingredients. The flow properties and resistance to clumping of the dry mix may be quantified by measuring cohesive strength using the direct shear method of ASTM standard D6128-97 (1988), hereby incorporated by reference, or by measuring the coefficient of sliding friction with a wall friction test. Preferably, the flow properties of the dry mix according to the invention will be within ±50%, ±40%, ±30%, ±20%, ±10%, ±5%, or ±2.5% of the same value measured for an otherwise identical dry mix in the absence of glycerine.

In one embodiment, the dry mixes are useful, useful for preparing food products, and typically comprise one or more food ingredients in particulate (powdered or granular) form having glycerine homogeneously dispersed thereon, the glycerine comprising from about 0.1% to about 3.0% by weight of the dry mix, the dry mix having a water activity ($a_w$) of less than 0.35 by weight.

Typically, the dry mix comprises an amount of flour suitable for forming an edible dough or batter when combined with water, for example from about 10% to about 99.9% by weight of the dry mix. In some variants, the flour comprises from about 40% to about 90% by weight of the dry mix, the glycerine comprises from about 0.5% to about 2.5% by weight of the dry mix, and the remainder comprises one or more additional ingredients suitable for human consumption, sugar being a preferred additional ingredient, particularly sucrose, dextrose, and/or fructose in crystalline or other solid particulate form.

In the broadest aspects, the invention is not limited by the manner in which the glycerine is applied to the remaining dry mix ingredients. However, it is preferred that the dry mix is prepared by spraying glycerine through one or more pressurized nozzles onto an agitated mass of the remaining dry ingredients in a ribbon blender or the like. The glycerine may be sprayed neat, in a suitable diluent, or may itself contain solubilized ingredients. It is contemplated that the dry mix will have unexpectedly superior results, including improved handling, flow properties, resistance to clumping, microbial stability, ability to enhance taste, mouthfeel, or other organoleptic attributes of a food product prepared from the dry mix, and/or shelf life of a food product prepared from the dry mix, when the glycerine is sprayed onto the dry components, preferably in a finely atomized spray.

The dry mix preferably has a moisture content below that of the flour from which it is prepared and thus will typically have a moisture content of less than about 12% by weight and more typically less than about 10% by weight. The dry mix will typically have a water activity of less than 0.91, more typically less than 0.87, preferably less than 0.80, more preferably less than 0.75, and more preferred still less than 0.70.

The dry mix may comprise one or more ingredients in addition to flour and glycerine as is customary for the intended food product. Additional ingredients include, without limitation, those selected from the group consisting of sugar (e.g., sucrose, dextrose, crystalline fructose, etc.), salt, starch, modified starch, protein (e.g., vital wheat gluten), food fiber (e.g., cellulose), hydrocolloids, baking soda (sodium bicarbonate), baking powder (single acting or double acting), sodium acid phosphate, dough conditioners, milk solids, egg solids, enzymes, leavening agents, emulsifiers, glycerides, shortening, oil, colorants, spices, flavorants, and combinations thereof.

In particular embodiments, the dry mix will further comprise one or more additional ingredients which aid in prolonging shelf life and/or improving resistance to staling. Notably, the dry mix may comprise an amount of a hydrolytic enzyme, such as an α-amylase enzyme, a maltogenic amylase enzyme, or a combination thereof effective to reduce or inhibit retrogradation of starch; and/or a modified starch, in particular a pre-gelatinized cross-linked acetylated potato starch; and/or a combination of an acidic polysaccharide gum, in particular xanthan gum, and a galactomannan, in particular guar gum.

In a related embodiment, a dry mix is provided for preparing a dough or batter when combined with a suitable amount of water which, upon cooking, provides bread products, including without limitation donuts, having improved organoleptic attributes, increased resistance to staling, improved moisture content, and improved resistance to moisture loss over time. The dry mix according to this embodiment will typically comprise:

(1) from about 40% to about 95% by weight flour;

(2) from about 0.1% to about 3% by weight glycerine;

(3) from about 1% by weigh to about 50% by weight sugar;

(4) from about 0.001% to about 10% by weight emulsifier;

(5) from about 0.001% to about 20% by weight gelatinized starch and/or gelatinized modified starch;

(6) from about 0.001% to about 5% by weight of a combination of an anionic polysaccharide and a galactomannan; and (7) an effective amount of hydrolytic enzyme to inhibit starch retrogradation, the hydrolytic enzyme being selected from the group consisting of alpha-amylases, maltogenic amylases, and combinations thereof;

wherein the glycerine is homogeneously dispersed on at least the flour portion of the dry mix, preferably on at least the flour and sugar portions of the dry mix, and wherein the dry mix has a moisture content of less than 15%.

The sugar is preferably a crystalline sugar such as crystalline sucrose, dextrose or fructose but may also suitably be a sugar in amorphous solid particulate form. The emulsifier may, for example, comprise mono- and diglycerides, sodium stearoyl lactylate (SSL), lecithin, or combinations thereof. The gelatinized starch may be, for example, gelatinized wheat starch and the gelatinized modified starch is preferably a pregelatinized cross-linked acetylated potato starch. The anionic polysaccharide is preferably xanthan gum and the galactomannan is preferably guar gum, and preferably the combination of xanthan gum and guar gum exhibits a synergistic increase in water holding capacity (WHC) and will typically fall within the weight ratios of about 2:1 to about 1:2, and preferably about 1:1 (xanthan gum to guar gum).

A method is also provided for improving resistance to microbial growth of flour-containing dry mixes comprising homogenously dispersing glycerine onto a mixture of particulate food ingredients to form a dry mix capable of forming a batter or dough when combined with a suitable amount of water, wherein the flour comprises from about 10% to about 99.9% by weight and the glycerine comprises from about 0.1% to about 3% by weight of the dry mix, the dry mix having a moisture content of less than 15% by weight and a water activity ($a_w$) of less than 0.91. The microbiologically stabilized dry mix will more typically have a moisture content of less than about 12% by weight, preferably less than about 10% by weight, and more preferably less than about 8% by weight based on the total weight of the dry mix. The microbiologically stabilized dry mix will typically have a water activity of less than 0.87, preferably less than 0.80, more preferably less than 0.75, and more preferred still less than 0.70. The dry mixes exhibit improved storage stability, particularly when stored in a sealed container which is substantially impermeable to outside air.

Also provided is a method for improving shelf life and/or moisture content and/or resistance to moisture loss over time and/or organoleptic attributes (e.g., taste, texture, mouthfeel, aroma, etc.) of a bread product, comprising (i) providing a dry mix capable of forming a dough or batter when combined with a suitable amount of water, the dry mix comprising from about 10% to about 99.9% by weight flour and from about 0.1% to about 3.0% by weight glycerine homogeneously dispersed on the flour, the dry mix having a moisture content of less than 15% by weight, (ii) combining the dry mix with an amount of water suitable to form a dough or batter, and (iii) cooking the dough or batter to form a bread product having improved shelf life, moisture content, resistance to moisture loss over time, and/or improved organoleptic attributes as compared to an otherwise identical bread product prepared in the absence of glycerine.

The measurable benefit due to the presence of glycerine in the dry mix may be any benefit, including without limitation, (1) an improvement in the moisture content of and/or moisture retention over time (e.g., 6 hours, 1 day, 2 days, 3 days, 1 week, etc.) in a food product formed therefrom, (2) an improvement in shelf-life of a food product formed therefrom, (3) an improvement in one or more organoleptic attributes (e.g., taste, texture, mouthfeel, aroma, etc.) of a food product formed therefrom, (4) an improvement in one or more physical properties (e.g., crumb structure, crumb firmness, loaf volume, etc.) of a food product formed therefrom, (5) an improvement in the quality of dough formed therefrom, and/or (6) an improvement in microbiological stability (e.g., resistance to microbial growth) of the dry mix.

A preferred particulate food ingredient according to the invention is flour, especially flour having a moisture content of 15% by weight or less. Typical grades of flour will have moisture contents of, for example, less than about 15%, 14%, 13%, 12%, 11%, 10%, 9%, or about 8% by weight. The term "flour" as used herein includes, but is not limited to, patent flour, all-purpose flour, bleached flour, bread flour, cake flour, cookie flour, pasty flour, cracker flour, durum flour, enriched flour, farina, graham flour, pastry flour, rice flour, rye flour, self-rising flour, semolina, unbleached flour, wheat flour, whole-wheat flour, wheat meal, corn meal, corn flour, durum flour, rye meal, rye flour, oat meal, oat flour, soy meal, soy flour, sorghum meal, sorghum flour, potato meal, potato flour, and any combination thereof. It is contemplated that any flour may be used in the practice of the invention.

The additional ingredients are preferably solid ingredients but may comprise liquid or semi-solid ingredients, including for example oils and fats, provided that the amounts of such non-solid ingredients is not so high as to render the dry mix not free flowing or cause substantial clumping. The additional ingredients may include, without limitation, solid ingredients such as sugar (sucrose, dextrose, fructose, etc.), mineral salts (including sodium chloride), hydrocolloids (e.g., vegetable gums), non-fat milk solids, egg solids, leavening agent(s), baking soda (sodium bicarbonate), baking powder, sodium acid phosphate, protein, spices, starch, modified food starch, dough conditioner(s), emulsifier(s), enzymes and the like, semi-solid ingredients such as shortening and fats, and liquid ingredients such as vegetable oil, high fructose corn syrup, and dimalt, to name a few.

In one embodiment, the glycerine is sprayed onto a portion of the dry ingredients not including flour. This embodiment is preferred where for example, the intended food product does not contain flour or where it is otherwise desired to add flour at a later stage. In another embodiment, glycerine is sprayed onto dry ingredients containing a portion of the final amount of flour used to prepare the intended food product, and the resulting glycerine-sprayed component may be subsequently mixed with additional flour to yield the final dry mix.

In various embodiments, the dry mix will comprise at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% by weight flour and from about 0.1% to about 3% by weight glycerine, more typically from about 0.5% to about 2.5% by weight glycerine, and preferably from about 0.75% to about 2% by weight glycerine, it being understood that the flour, additional ingredients, and glycerine will collectively comprise no more than 100% by weight of the dry mix. Amounts of glycerine may include any intermediate value within the foregoing ranges, such as 0.8%, 0.9%, 1%, 1.1%, 1.2%, 1.3%, 1.4%, 1.5%, 1.6%, 1.7%, 1.8% or 1.9%.

It will be understood that the amounts of glycerine described herein refer to glycerine which is added to the dry mix, not to the total glycerine in the food product, as it is known, for example, that small quantities of glycerine are produced during yeast fermentation of sugar.

In certain exemplary embodiments, flour will comprise 10-20% by weight, 20-30% by weight, 30-40% by weight, 40-50% by weight, 50-60% by weight, 60-70% by weight, 70-80% by weight, 80-90% by weight, 90-95% by weight, or 95-99.9% of the dry mix; glycerine will comprise 0.1-0.25% by weight, 0.25-0.5% by weight, 0.5-0.75% by weight, 0.75-1.0% by weight, 1.0-1.25% by weight, 1.25-1.5% by weight, 1.5-1.75% by weight, 1.75-2.0% by weight, 2.0-2.25% by weight, 2.25-2.5% by weight, 2.5-2.75% by weight, or 2.75-3.0% by weight of the dry mix; and, if present, the additional ingredients (which are preferably in particulate form), individually or collectively, will comprise about 1-5% by weight, 5-10% by weight, 10-20% by weight, 20-30% by weight, 30-40% by weight, 40-50% by weight, 50-60% by weight, 60-70% by weight, 70-80% by weight, or 80-90% by weight of the dry mix.

The dry mixes according to the invention may comprise a starch component, which is in addition to the starch fraction provided by any flour component. This starch component may comprise any starch, including without limitation, corn starch, waxy maize starch, potato starch, waxy potato starch, tapioca starch, wheat starch, and rice starch, to name a few. Potato starch and wheat starch are preferred starches according to the invention.

The optional starch component may also be modified (chemically, biochemically, physically or otherwise) to increase its ability to hold water. One way in which starch may be modified is by adjusting the relative amounts of amylose and amylopectin. For example, WO 92/11376 and CA 2,061,443 disclose genetically engineered modification of potato starch to suppress the formation of amylose, producing a potato with a starch content containing essentially pure amylopectin. The starch may also be chemically modified by introducing functionalities, such as phosphate, hydroxypropyl, acetyl, and the like on the polysaccharide chains. Starch may also be modified by introducing cross-links by treatment with, for example, phosphorus oxychloride ($POCl_3$), sodium trimetaphosphate, adipic anhydride, epichlorohydrin, and the like. It is well-known in the art to prepare modified potato starches by crosslinking with a variety of agents, with particular mention being made of crosslinking with $POCl_3$ under alkaline conditions, as disclosed in U.S. Pat. No. 5,648,110 to Wu, the disclosure of which is hereby incorporated by reference. Other suitable modified starches and methods for modifying starches are described in U.S. Patent Pub. 2006/0222740, incorporated by reference herein. The cross-linked starch will usually comprise between 1 ppm to less than 1,000 ppm cross-linking (based on dry weight of starch solids), and more typically will have a degree of crosslinking between about 1 ppm and about 800 ppm, or between about 5 ppm and about 750 ppm, or between about 25 ppm and about 300 ppm, without limitation.

The modified starches will preferably have a higher water holding capacity (WHC) than the native, unmodified starch. The starch or modified starch is preferably pre-gelatinized as opposed to granular, although in practice the use of granular starch is contemplated to be within the scope of the invention. Preferably a pre-gelatinized starch is one which is gelatinized prior to inclusion in the dry mix.

One starch which has been found to be particularly useful is a lightly crosslinked acetylated pregelatinized potato starch available under the tradename PenPlus® 300 (Penford Foods). The potato starches available from Avebe (Veendam, The Netherlands) under the tradenames EZ 1030 and Paselli EZ™ are also contemplated to be useful.

When present, the starch component will typically comprise from about 0.001% to about 20% by weight of the dry mix, more typically from about 0.01% to about 5% by weight, and preferably from about 0.1% to about 2% by weight of the dry mix.

The dry mix may comprise one or more hydrocolloids. The hydrocolloid(s) may be any hydrocolloid that is compatible with a food product, such as vegetable gums, including but not limited to alginates, carrageenan, dextran, furcellaran, pectin, gelatin, gum agar, locust bean gum, gum ghatti, guar gum, gum tragacanth, acacia, gum arabic, xanthan gum, karaya gum, tara gum, cellulose derivatives, starch derivatives, and combinations thereof, to name a few.

Preferred hydrocolloids are water-soluble, non-gelling gums, such as xanthan, guar, CMC (carboxymethyl cellulose) and the like. Gums which form gels, such as alginates, pectin, kappa and iota carrageenan and the like are not preferred for use in this invention as are non-polysaccharide hydrocolloids, such as gelatin. Thus, in one embodiment of the invention, the dry mixes are free of or substantially free of gums and/or non-polysaccharide hydrocolloids which form gels. By "substantially free" it is meant that the gelling gums and/or non non-polysaccharide hydrocolloids comprise less than 0.01%, preferably less than 0.001%, and more preferably less than about 0.0001% by weight of the dry mix.

A combination of an anionic polysaccharide hydrocolloid and a galactomannan polysaccharide hydrocolloid has been found to be preferred for use in the dry mixes. The anionic polysaccharide will preferably include within its molecular structure dependent carboxylic acid groups. Xanthan gum and carboxymethyl cellulose are such polysaccharides. Galactomannans are polysaccharide composed solely of mannose and galactose. Guar gum, a galactomannan which typically has a mannose-to-galactose ratio of about 1.8:1, has proven to be well-suited for use.

Combinations of xanthan gum and guar gum at a weight ratio of 1:4 to 4:1, preferably 1:3 to 3:1, more preferably 1:2 to 2:1, and most preferably about 1:1, have been found to be preferred for use. Xanthan gum is a high molecular weight polysaccharide which is typically obtained by pure culture fermentation of glucose with a bacterium of the genus *Xanthamonas*, such as *Xanthamonas campestris*. Xanthan is a heteropolysaccharide made up of building blocks of D-glucose, D-mannose and D-glucuronic acid. Guar gum may be isolated from the seeds of the guar bean (*Cyamoosis Tetraoonaolobas* L. taub.) which is native to India and Pakistan.

Unless otherwise stated, the term galactomannan includes hydrolysis products known in the art as hydrolyzed galactomannans which assay as a soluble dietary fiber but have reduced viscosity in water, such as partially hydrolyzed guar gum (PHGG). However, in preferred embodiments, the galactomannan component will comprise or consist essentially of polysaccharides which have not been hydrolyzed, for example, natural guar gum. In other embodiments, the galactomannan component will comprise less than about 50% by weight, preferably less than about 25% by weight, and more preferred still, less than about 5% by weight hydrolyzed galactomannan. In a preferred embodiment, the galactomannan component is free of hydrolyzed galactomannan, save for any small amount of hydrolysis component present in the natural galactomannan extract.

When present, the hydrocolloid component will typically comprise from about 0.001% to about 5% by weight of the dry mix, usually from about 0.01% to about 1% by weight, and preferably from about 0.05% to about 0.5% by weight. The amount of hydrocolloid employed may vary depending on the nature of the hydrocolloid(s) used, and in particular as a function of their water holding capacity. In many embodiments, including those comprising Xanthan gum, alone or in combination with a galactomannan such as guar gum, the hydrocolloid component will comprise from about 0.05% to about 0.5% by weight of the dry mix.

In one useful embodiment, the hydrocolloid component comprises a synergistic combination an anionic polysaccharide, such as xanthan gum, and a galactomannan, such as guar gum, by which is meant that the viscosity of an aqueous solution having a given amount of the combination is greater than the viscosity of an otherwise identical aqueous solution having the same amount of either anionic polysaccharide (e.g., xanthan gum) or galactomannan (e.g., gaur gum), alone. Preferably, the synergistic combination comprises a weight ratio of xanthan gum to gaur gum of about 1:1.

In one embodiment of the invention, the hydrocolloid(s) and/or starch component will have an average particle size greater than 20 μm and preferably will not have been subject to pulverization as described in U.S. Patent Pub. 2006/0182853 to Kawai et al., the disclosure of which is hereby incorporated by reference.

The dry mix will typically comprise a sugar component, such as a monosaccharide or disaccharide, and combinations thereof. The sugar component will typically, though not necessarily, have a saturated water activity of at least about 0.8, and more typically at least about 0.86. Suitable monosaccharides include, without limitation, glucose (dextrose), fructose, galactose, and the like. Suitable, disaccharides include, without limitation, sucrose, maltose, lactose, trehalose and the like. In one embodiment, the sugar component is essentially free of maltose and maltotriose, meaning that the amount of these sugars, as a fraction of the sugar component, is less than about 5% by weight, preferably less than about 2% by weight, and more preferred still, less than about 1% by weight. Sucrose is a currently preferred sugar for use in the dry mixes of the invention, due in part to its low cost, its ubiquity as a sweetener, and/or its saturated water activity of about 0.86. Crystalline fructose is also contemplated to be useful.

In some embodiments, the sugar component may comprise sugar alcohols addition to monosaccharides and/or disaccharides. Sugar alcohols include, without limitation, erythritol, mannitol, sorbitol, xylitol, maltitol, isomalt, lactitol, hydrogenated starch hydrolysate (HSH), and the like. In the broadest implementations of the inventions, the sugar component may include one or more sugar alcohols. However, typically, the sugar component will be substantially free of sugar alcohols, meaning that sugar alcohols comprise less than about 5%, preferable less than about 2.5%, and more preferably less than about 1% by weight of the sugar component. In other embodiments, the sugar component is free of sugar alcohols. The terms “monosaccharide” and “disaccharide” are not intended to embrace sugar alcohols. The term “sugar alcohol,” as used herein, does not include glycerine.

The sugar component is preferably in particulate form and will typically comprise from about 0.5% to about 50% by weight of the dry mix, more typically from about 5% to about 25% by weight of the dry mix. In one embodiment of the invention, the sugar component will comprise from about 1.0% to about 15% by weight of the dry mix in applications intended for yeast leavened products (such as pizza dough, white bread, yeast leavened donuts, etc.), including representative embodiments wherein the sugar, notably sucrose, dextrose or crystalline fructose, comprises from about 2% to about 12% by weight, about 3% to about 10% by weight, or about 6 to about 9% by weight, based on the total weight of the dry mix.

For use in cake-type products (e.g., products made from flour comprising predominately cake flour), including cakes and cake donuts, the sugar will typically comprise from about 5% to about 50% by weight of the dry mix, and more often will comprise from about 10% to about 35% by weight of the dry mix, including a representative embodiment wherein the sugar, notably sucrose, dextrose or crystalline fructose, comprises from about 15% to about 25% by weight of the dry mix.

The sugar component preferably comprise at least about 50%, more often at least about 75%, and typically at least about 80%, 85%, 90%, or 95% by weight sugar in particulate form, whether crystalline or amorphous.

The dry mixes of the invention may further comprise one or more food grade emulsifiers. Suitable emulsifiers include, without limitation, lecithin; monoglycerides; mono-, di-glycerides; ethoxylated mono- and di-glycerides; sodium stearoyl lactylate (SSL); sorbitan esters of fatty acids (e.g., sorbitan monostearate); diacetyl tartaric acid esters of mono-glycerides (DATEM); glyceryl-lacto esters of fatty acids (e.g., glycerol lactopalmitate); polysorbate 60, polysorbate 65, polysorbate 80, sodium lauryl sulphate, monoglyceride citrate, calcium stearoyl-2-lactylate, diacetyl sodium sulfosuccinate, sodium stearoyl fumarate, and succinylated mono glycerides, and combinations thereof. Preferably, though not necessarily, the emulsifier is a solid.

In one embodiment of the invention, the dry mix will comprise an emulsifier which provides a crumb softening effect. Monoglycerides are contemplated to be well-suited for crumb-softening and particular mention may be made of the water dispersible monoglyceride from soybean oil sold under the trade name Starplex™ 90 (American Ingredients Co.). Mixtures of mono- and di-glycerides are also expected to be suitable for this purpose. The mono-glycerides (and optionally di-glycerides), will typically comprise from about 0.001% to about 10% by weight of the dry mix, more typically from about 0.01% to about 5% by weight. It is particularly desirable to include mono-glyceride emulsifiers in dry mixes which are intended for yeast leavened products. Whereas, bread products having a weaker crumb structure, including those made predominately from cake flour, will not benefit as much from mono-glycerides and therefore their use is strictly optional.

The emulsifier component will also preferably comprise an emulsifier which modulates the water sorption by protein. Particular mention may be made of sodium stearoyl lactylate (SSL) which is believed to partially envelop protein and thus reduce its sorption of water. Sodium stearoyl lactylate is commercially available under the trade designation Emplex™ (American Ingredients Co.). SSL will typically comprise from about 0.01% to about 5% by weight of the dry mix, preferably from about 0.1% to about 2% by weight of the dry mix.

The dry mixes may further comprise one or more hydrolytic enzymes having activity against starch, including without limitation, an alpha-amylase, a maltogenic amylase, or a combination thereof in an effective amount to inhibit or prevent starch retrogradation.

The term “alpha-amylase” as used in the present invention typically refers to a 1,4-alpha-D-glucan glucanohydrolase which catalyses the conversion of polysaccharide containing alpha-(1-4)-linked glucose units in the presence of water to maltooligosaccharides. The alpha-amylase may be of any origin, including mammalian and plant, and preferably of microbial (bacterial, yeast or fungal) origin. Recombinantly prepared alpha-amylases are also contemplated to by suitable.

Commercially available amylases useful in the present invention include, without limitation, FUNGAMYL® (an *Aspergillus oryzae* alpha-amylase, available from Novo Nordisk A/S, Denmark), BAN® (a *Bacillus licheniformis* alpha-amylase, available from Novozymes), TERMAMYL® (a *Bacillus alpha-amylase*, available from Novo Nordisk A/S, Denmark), and THERMOZYME®, a *Bacillus* alpha-amylase, available from Novo Nordisk A/S, Denmark). Other useful commercially available amylase products include GRINDAMYL® A 1000 or A 5000 (available from Grindsted Products, Denmark) and AMYLASE H or AMYLASE P (available from Gist-Brocades, The Netherlands).

The term "maltogenic amylase" as used in the present invention typically refers to a 1,4- or 1,6-alpha-maltohydrolase which catalyses the removal of alpha-maltose from starch. A commercially available maltogenic amylase is NOVAMYL™ 1500 MG (Novo Nordisk A/S, Denmark) which is a Bacillus stearothermophilus maltogenic amylase having an activity of at least about 1500 MANU/g (MANU=Maltogenic Amylase Novozyme Units). One MANU may be defined as the amount of enzyme required to release one μmol of maltose per minute at a concentration of 10 mg of maltotriose (Sigma M 8378) substrate per ml of 0.1 M citrate buffer, pH 5.0 at 37° C. for 30 minutes.

NOVAMYL™ 1500 MG is said to be an exo-acting maltogenic amylase enzyme (E.C.3.2.1.133, glucan alpha-1,4-maltohydrolase) which catalyses the hydrolysis of alpha-1,4-glucosidic linkages in amylose, amylopectin and related glucose polymers. The enzyme successively removes maltose units from the non-reducing end of the polysaccharide chain until, if conditions permit, the molecule is degraded or, in the case of amylopectin, a branch-point is reached. This enzyme preparation may be, for example, a maltogenic amylase produced by submerged fermentation of a non-pathogenic and non-toxicogenic strain of *Bacillus subtilis* which, by recombinant DNA techniques, contains the amyM gene from *Bacillus stearothermophilus* coding for maltogenic amylase. It is believed that the same enzyme is currently available under the trade name Essential Soft™ 1500 (Novozyme). In one embodiment of the invention, the maltogenic amylase will have an activity between about 1,500 and about 2,000 or 3,000 MANU/g. Another maltogenic amylase, having an activity of at least about 4,000 MANU/g is available under the trade name Maltogenase 4000 L (Novo Nordisk). In one embodiment of the invention, the maltogenic amylase will have an activity between about 4,000 and about 4,500 or 5,000 MANU/g. Any of the amylases disclosed in U.S. Pat. No. 7,189,552 to Lan et al; U.S. Pat. No. 4,598,048 to Diderichsen et al., and U.S. Pat. No. 4,604,355 to Outtrup, the disclosures which are hereby incorporated by reference herein, are also contemplated to be useful.

There is some latitude in the amount of alpha amylase employed, as the appropriate amount will depend significantly on the activity of the enzyme. The amount should be carefully controlled to assure that the resulting bread product does not have a gummy texture. The preferred alpha amylase according to the invention is the *Bacillus licheniformis* alpha-amylase available under the trade name BAN® 800 MG (Novozymes) which is believed to have an activity of at least 800 KNU-B (Kilo Novo Units-BAN).

It is believed that alpha-amylases, including BAN® 800 MG can be effectively employed in an amount ranging from about 0.00001% to about 0.1% by weight, more typically from about 0.0001% to about 0.01% by weight, based on the weight of the entire dry mix. The maltogenic amylases, including Essential Soft™ 1500, can be effectively employed in an amount ranging from about 0.0001% to about 1% by weight, more typically from about 0.001% to about 0.5% by weight, based on the weight of the entire dry mix.

The weight ratio of the maltogenic amylase to the alpha amylase will typically range from about 10:1 to about 1,000:1, although weight ratios in the range of about 25:1 to about 500:1 are more preferred. In some embodiments, the weight ratio of the maltogenic amylase to the alpha amylase will range from about 50:1 to about 200:1, or from about 75:1 to about 150:1, particularly in embodiments where the maltogenic amylase has an activity of at least about 1,500 MANU/g and the alpha amylase has an activity of at least about 800 KNU-B.

In one embodiment, the dry mix is free of or substantially free of additional enzymes, including cellulase, hemicellulase, lipase, protease, pullulanase, amyloglucosidase, glycerol oxidase, pentosanase, phospholipase, transglucosidase, 1,4-α-glucan branching enzyme, 4-α-glucan 6-α-D-glucosyl transferase, and/or xylanase enzymes to name a few. By "substantially free" of additional enzymes is meant that the dry mix contains such enzymes in amounts sufficiently low that no measurable affect on shelf-life or bread quality is observable, which will typically, though not necessarily, be less than about 0.001% by weight or less than less than about 0.0001% by weight depending on the activity of the enzyme. In another embodiment, the alpha amylase and/or the maltogenic amylase enzymes are not coated or partially coated with a food grade lipid, in contrast to the enzymes described in U.S. Pat. No. 6,635,289 to Horn, the disclosure of which is incorporated by reference herein. In yet another embodiment, the alpha amylase is not an alpha amylase mutant.

In one embodiment, the dry mix is free of or substantially free of (e.g., less than about 1%, or about 0.5%, or about 0.1% by weight) structurally expanded cellulose, as described in U.S. Pat. No. 6,251,458 to Weibel, the disclosure of which is incorporated by reference herein. In one embodiment, expanded puffed particulates, such as the direct expanded puffed particulates fabricated from a cooked cereal dough described in U.S. Pat. No. 7,264,835 to Funk, the disclosure of which is incorporated by reference herein, are substantially (e.g., less than about 1%, or about 0.5%, or about 0.1% by weight) or entirely excluded from the dry mix.

In some embodiments, the dry mixes will comprise a flavorant component which can either introduce new flavors into the food (e.g. bread) product or can restore the natural flavor of the food (e.g. bread) which might be lost due in part to staling. Any suitable flavorant may be used, although it is preferable that the flavorant be in solid form, or combined (coated, encapsulated, admixed, etc.) with a solid substrate if it is included in the dry food components. Flavorant may also be included (e.g., dissolved or dispersed) in the glycerine-containing liquid. In a preferred embodiment, the flavorant comprises a so-called "reaction flavor" or "process flavor," such as Maillard reaction precursors and the like, as described generally in, for example, U.S. Pat. No. 4,663,168 to Von Fulger et al.; U.S. Pat. No. 6,432,459 to Bel Rhlid et al.; U.S. Patent Pub. 2006/0045954 to Young et al.; U.S. Patent Pub. 2004/0224077 to Kochhar et al.; and U.S. Patent Pub. 2004/0156980 to Fleury Rey et al., the disclosures of which are hereby incorporated by reference. In one embodiment, the glycerine-containing liquid includes a reaction flavorant formed from glycerine and one or more amino acids. Amino acids for formation of reaction flavor may include without limitation alanine, cysteine, aspartic acid, glutamic acid, phenylalanine, glycine, histidine, isoleucine, lysine, leucine, methionine, asparagine, proline, glutamine, arginine, serine, threonine, valine, tryptophan, tyrosine, or any combination thereof. Reaction flavorant may be formed, for example, by adding amino acid to glycerine and heating for an amount of time. The heating temperature may be for example, from about 100° F. to 250° F., 110° F. to 190° F., 120° F. to 180° F., or from about 140° F. to 170° F., including exemplary embodiments of about 100° F., 110° F., 120° F., 130° F., 140° F., 150° F., 160° F., 170° F., 180° F., 190° F., or about 200° F. The amount of time for formation of the reaction flavorant will typically range from 1 to 60 minutes, more typically from 5 to 30 minutes, depending on the temperature, including without limitation, reaction times of 1 minute, 5 minutes, 10 minutes, 15 minutes, 20 minutes, 25 minutes, 30 minutes, or greater. In a preferred embodiment, the amino acid component is or comprises proline, which is added to glycerine, preferably neat glycerine, and heated to a temperature from 140° F. to 180° F. for 10 to 20 minutes, preferably about 160° F. for about 15 minutes. Reaction flavor may be formed in bulk glycerine-containing liquid, preferably neat glycerine, or may be formed in an aliquot of glycerine to form a concentrate, which is added to the glycerine-containing liquid.

The dry mixes may employ any of the ingredients and/or anti-staling additives disclosed in U.S. patent application Ser. No. 12/186,824, the entire disclosure of which is hereby incorporated by reference. The methods for preparing bread and donuts having improved shelf life and resistance to staling described in U.S. patent application Ser. No. 12/186,824, incorporated by reference herein, are also useful for preparing bread and donuts with the dry mixes of the present invention.

The glycerine may be added to the dry mix ingredients by any mixing method known in the art. What is important is that the glycerine is homogenously dispersed on the dry ingredients so that localized clumping is avoided and so that the time required for equilibration of moisture between glycerine and the other ingredients is minimized. In this manner, the antimicrobial benefit of glycerine addition is most fully realized and the handling and flow properties of the dry mix are optimized. The glycerine may be added (e.g., sprayed) neat to the dry mix ingredients or may be thinned with or dissolved in a suitable volatile solvent, such as ethanol. Additional components, including oils, flavorants, or the like may be dissolved in the glycerine prior to its addition to the dry mix ingredients. Additional components such as flavorant may be added to the glycerine-containing liquid in a pure form, or with the use of a diluent, such as an aliquot of the glycerine-containing liquid.

It is less preferred to use, and some embodiments exclude the presence of, so-called glycerinated egg yolks as a source of glycerine. Other components that may be substantially or entirely excluded from the glycerine-containing liquid may be components such as carboxylic acids such as acetic acid, or microencapsulated acid such as encapsulated citric acid, fumaric acid, lactic acid, malic acid, or the like. In one embodiment, such components are excluded from the glycerine-containing liquid to be sprayed on the dry mix and the dry mix itself. In another embodiment, such components are excluded from the glycerine-containing liquid, but may optionally be present independently in the dry mix.

In one embodiment, the glycerine is added neat or as a component in a liquid, wherein the liquid has a water activity ($a_w$) less than 0.35. In additional embodiments, the glycerine-containing liquid has a water activity from about 0.001 to about 0.35, preferably from about 0.005 to about 0.33, typically less than about 0.3, more typically less than about 0.2, and preferably less than about 0.1, less than about 0.05, or less than about 0.03. In one embodiment, the liquid will have a water activity from about 0.01 to about 0.02. The term "glycerine-containing liquid," as used herein, is intended to include neat glycerine, as well as glycerine combined with a diluent liquid, and glycerine (neat or including a diluent) which further comprises one or more components dissolved or homogeneously dispersed therein.

In one embodiment, the glycerine-containing liquid comprises less than 15% by weight water, or less than 12.5%, 10%, 9%, 8%, 7%, 6%, 5%, 4%, 3%, 2%, 1%, 0.5%, or less than 0.1% by weight water. In one embodiment, the glycerine-containing liquid is substantially anhydrous, by which is meant that it comprises less than 1% by weight water. In another embodiment, the liquid is anhydrous by which is meant that the level of water is so small that it would have no functional impact on the dry mix, as measure by the MFSL and physical handling tests described herein.

The glycerine containing liquid will typically comprise 50% by weight glycerine or more, or greater than 60%, 70%, 80%, 90%, 95%, 96%, 97%, 98%, 99% by weight or more glycerine.

In one embodiment, the glycerine-containing liquid may optionally contain up to 5% by weight emulsifier based on the weight of glycerine, although its inclusion is strictly optional. In other words, the weight ratio of glycerine to emulsifier in the liquid will, in some embodiments of the invention, be greater than 95:5. For example, if the liquid contains neat glycerine with 10% emulsifier and is then diluted with a diluent, thereby lowering the amount of emulsifier to less than 5% of the liquid, that amount would nevertheless be excluded in such embodiments. In one embodiment, the glycerine-containing liquid is substantially free of emulsifier, although the dry ingredients may separately contain an emulsifier as desired. Such emulsifiers may include in some embodiments polysorbates, blended mono- and di-glycerides, distilled acetylated monoglycerides, distilled monoglyceride, sodium stearoyl lactylate, and ethoxylated monoglyceride. In one embodiment, the glycerine-containing liquid contains no added emulsifier. In some embodiments, polysorbates are substantially or entirely excluded from the glycerine-containing liquid, in contrast to, for example, U.S. Pat. No. 5,738,900 to Cuadrado et al., the contents of which are incorporated by reference in their entirety. Such polysorbates include polysorbate 80, polysorbate 60, or the like.

Typically, the dry ingredients, including any amounts of semisolid and liquid components, are mixed in a suitable mixer which agitates the mass without excessive shear or comminution, such as a ribbon blender, paddle blender, vertical cone screw blender, fluidized bed, high shear mixer, or the like while glycerine is sprayed onto the mass. In the preferred practice, the solid components are mixed in a ribbon blender while neat glycerine is sprayed onto the agitated mass, in atomized form, from overhead pressurized spray nozzles. In one embodiment, substantial amounts of non-solid and/or non-particulate components are excluded from the dry ingredients, by which is meant any ingredients or amount thereof that would measurably impart an unacceptable or undesirable change in the flow or resistance to clumping properties, or any other physical property of the dry mix, or its resistance to spoilage, are excluded.

The dry mixes of the invention will exhibit improved resistance to microbial growth as compared to otherwise identical mixes in the absence of glycerine. This is because the water activity ($a_w$) of glycerine is about 0.33 whereas the $a_w$ value for flour, the major component in most embodiments, is about 0.8. Below an $a_w$ of 0.8 most yeast, molds, and bacteria cannot grow. Provided the dry mix is kept in a closed system, such as a sealed bag, silo, bin, container (collectively referred to herein as a "container"), whereby ambient moisture in contact with the dry mix is minimized, there will therefore be a net migration of water from flour to glycerine when equilibrium is reached after the two components are brought into contact. The container preferably is substantially impermeable to air by which is meant that the amount of outside air that is capable of penetrating the sealed container is so insubstantial as to not have a measurable impact on the moisture content of the dry mix.

The water activity of the dry mix may be used to estimate the mold-free shelf life (MFSL) of the dry mix according to the empirical equation $\mathrm{Log}_{10}(\mathrm{MFSL})=7.91-(8.1\times a_w)$ where MFSL is given in terms of days at 21° C., according to the method of D. A. L. Seiler, "The stability of intermediate moisture foods with respect to mould growth," in R. Davies, G. G. Birch and K. J. Parker (Eds.) *Intermediate Moisture Foods*, (Applied Science Publishers Ltd., London, 1976) pp 166-181, the disclosure of which is hereby incorporated by reference herein. The dry mixes are expected to have a MFSL at least 5%, at least 10%, at least 15%, at least 20%, at least 25%, at least 30%, at least 40%, or at least 50% longer than otherwise identical dry mixes that do no comprise glycerine.

As a collateral benefit, it has been observed that dusting of flour-containing dry mixes is reduced by homogenously dispersing glycerine thereon in an amount form about 0.1% to about 3% by weight. Accordingly, a method is provided for reducing dusting and thereby improving the handling of a flour-containing dry mix.

The dry mixes according to the invention may be conveniently stored in containers and have flow properties suitable for transfer using hoppers, chutes and the like. The dry mixes may be charged into a suitable mixer, such as a planetary mixer, and combined with a suitable amount of water and optionally additional ingredients and mixed to make dough or batter according to customary methods. It is within the skill in the art to determine the amount of water suitable for forming a dough or batter.

The dough or batter may be cooked (e.g., baked, fried, or boiled) to make a variety of bread products including, but are not limited to, white bread, wheat bread, tortillas, rolls and buns, specialty/artisan breads, rye bread, whole grain varietals, bagels, pasta, grain-based snack foods, cereals, crackers, cookies, cakes, muffins, pastries, pancakes, pizza crusts, doughnuts, grain-based nutritional supplements, and salty snacks such as pretzels, tortilla chips, corn chips, and potato chips.

The water content of the resulting bread product can be measured by any suitable method, including the Association of Official Analytical Chemists (AOAC 2002), Method 925.09 or Method 925.40. Staling may be quantified organoleptically according to American Association of Cereal Chemists (AACC 2000), Method 74-30 or by measuring crumb firmness according to AACC 2000, Method 74-10A. Loaf volume is suitably measured by the rapeseed displacement method according to AACC 2000, Method 10-05. Each of the foregoing AOAC and AACC methods are incorporated by reference herein.

In one exemplary embodiment, the dry mixes are useful for preparing donuts having improved shelf live, moisture retention, and/or resistance to staling. The dry mixes are suitable for preparing both cake donuts and yeast donuts.

In the case of yeast leavened donuts, representative ingredients in the dry mix include, without limitation, sugar, shortening, nonfat dry milk, egg solids, salt, yeast and/or flour. In the case of a cake donut, representative dry ingredient include, for example, fine granulated sugar, dextrose, salt, egg yolk solids, nonfat dry milk, shortening, sodium bicarbonate, sodium acid phosphate, bread flour, cake flour, and/or defatted soy flour. These formulations are provided by way of illustration only are not intended to form any part of the invention unless otherwise specified. One skilled in the art will recognize that numerous variations exist for yeast donut and cake donut recipes, all of which may be employed in the practice of the invention. In the case of both yeast donut and cake donut dry mixes, glycerine may be sprayed onto the dry mix through pressurized overhead nozzles in a ribbon mixer or the like while the remaining ingredients are agitated. Preferably, the dry mixes comprise alpha-amylase and maltogenic amylase enzymes, a synergistic combination of xanthan gum and guar gum, and modified potato starch in amounts effective to inhibit staling and/or improve moisture retention.

The dry mix is added to the bowl of a suitable mixer and a volume of water is added thereto and mixed to form a dough or batter. In the case of a cake donut, the batter is usually allowed to rest in the bowl for about for about 10 minutes (floor time). In the case of yeast leavened donuts, the dough is allowed to rest for about 45 minutes to one hour (fermentation time). The yeast dough is sheeted and cut and the cut pieces are place in a proof box, typically at 96-100° F. at 55-60% relative humidity. The cut pieces are typically proofed for about 40 to 50 minutes. In both cases, the prepared dough or batter is deposited into a fryer having an oil temperature of about 320° F. to about 440° F., more typically about 375-385° F., or optimally about 385° F. The dough is heated for about 40 seconds to about 50 or 60 seconds and then flipped and heated for another period of about 40 seconds to about 50 or 60 seconds. The donut optimally has an internal temperature of about 200 to about 210° F. on exiting the fryer.

When the dough is first deposited in the heated oil, the temperature of the dough rapidly rises above about 130° F. to about 140° F. causing starch granules to rupture, thereby providing accessible sites for enzymatic hydrolysis. Enzymatic hydrolysis of starch by action of the alpha amylase and maltogenic amylase enzymes (if present) occurs during this time window and continues until the dough temperature reaches about 190° F. at which point the enzymes will be effectively denatured and hydrolysis ceases or becomes insubstantial. By "effectively denatured" is meant that the enzyme activity is so low that no measurable effect on the dough is observed after this point. The total window for enzymatic hydrolysis under the forgoing conditions is expected to be no more than about 15 to about 30 or 45 seconds, and likely occurs predominately after the dough is flipped. Thus, it will be seen that the hydrolysis is essentially fixed by the process parameters and the degree of hydrolysis will largely be determined by the selection of enzymes, their activity, and the amount of enzyme employed. After the enzymes are denatured during frying, there will be no additional measurable enzymatic activity. The dough is then removed from the fryer and cooled to room temperature.

The resultant donuts may have a shelf-life at least about at least about 10% longer, typically at least about 20% longer, preferably at least about 30% longer, more preferably at least about 40% longer, and more preferred still at least about 50% longer than otherwise identical donuts prepared in the absence of glycerine, and in particular glycerine in combination with α-amylase and maltogenic amylase enzymes, a synergistic combination of xanthan gum and guar gum, and/or modified starch. It is contemplated that donuts made from the dry mixes of the invention may achieve a shelf-life greater than about 40%, greater than about 50%, greater than about 75%, or even greater than 100% longer than otherwise identical donuts prepared in the absence of glycerine, and in particular in the absence of glycerine in combination with α-amylase and maltogenic amylase enzymes, a synergistic combination of xanthan gum and guar gum, and/or modified starch. The donuts according to the invention will have a improved moisture and mouthfeel, particularly on storage, as compared to otherwise identical donuts prepared in the absence of glycerine.

Example 1

A dry mix for preparing a yeast raised donut having a prolonged shelf life and/or improved moisture content and/or improved organoleptic attributes is provided in Table 1.

TABLE 1

| Ingredient | Weight % |
| --- | --- |
| Bread Flour | 71.04 |
| Cake Flour | 8.16 |
| Soy Flour | 0.61 |
| Bulk Dextrose | 7.14 |
| Bulk Soy Oil | 6.12 |
| Mono- and Diglycerides | 0.51 |
| Sodium Stearoyl Lactylate (SSL) | 0.51 |
| Flavor | 1.02 |
| Salt | 2.04 |
| Sodium Bicarbonate | 0.51 |
| Sapp 28 (Sodium Acid Pyrophosphate) | 0.71 |
| Gelatinized Wheat Starch | 0.61 |
| Glycerine | 1.02 |
| Total | 100.00 |

The donut dry mix is prepared by spraying glycerine onto the remaining dry mix ingredients through overhead nozzles while the dry mix ingredients are agitated in a ribbon blender. The dry mix is free of clumps and caking and has powder flow characteristics that are visually indistinguishable from an otherwise identical dry mix that does not contain glycerine, including a lack of cohesion when squeezed with the hand and a return to loose particulate (powder or granular) form when the hand is opened.

Water and yeast are then added to a mixing bowl containing the donut dry mix and mixed to form a dough of the desired consistency. The mixed dough is allowed to rest for 45 to 60 minutes (Fermentation Time) and then the dough is sheeted and cut to shape. The cut pieces are transferred to a proof box (96-100° F. @ 55 to 60% relative humidity) and held for 40 to 50 minutes.

The proofed pieces of dough are deposited into a fryer containing oil at a temperature of about 375° F. to 385° F. and fried for 45 to 50 seconds. The pieces are flipped and fried for an additional 45 to 50 seconds and then removed from the oil (total time to exit=about 90 second to about 100 seconds). The exiting donut has an internal temperature of about 202° F. to about 210° F. The donuts are air cooled to provide the finished product.

The resultant donuts have improved moisture content, mouthfeel, texture, and prolonged shelf-life, as compared to an otherwise identical donut prepared in the absence of glycerine.

Example 2

A dry mix for preparing a yeast raised donut having a prolonged shelf life and/or improved moisture content and/or improved organoleptic attributes is provided in Table 2.

TABLE 2

| Ingredient | Weight % |
| --- | --- |
| Yeast Raised Donut Mix | |
| Bread Flour | 69.657 |
| Cake Flour | 8.000 |
| Soy Flour | 0.600 |
| Bulk Dextrose | 7.000 |
| Bulk Soy Oil | 6.000 |
| Mono Bulk (Mono- and diglycerides) | 0.500 |
| Sodium Stearoyl Lactylate (SSL) | 0.500 |
| Flavor | 1.000 |
| Salt (sodium chloride) | 2.000 |
| Sodium Bicarbonate | 0.500 |
| Sapp 28 (Sodium acid pyrophosphate) | 0.700 |
| Gelatinized Wheat Starch | 0.600 |
| Anti-Staling Additive | |
| Patent Flour | 1.235 |
| Starplex ™ 90 (Monoglyceride) | 0.136 |
| Crystalline Fructose | 0.130 |
| Emplex ™ (Sodium Stearoyl Lactylate) | 0.026 |
| Guar gum | 0.056 |
| Xanthan gum | 0.056 |
| Pen Plus ™ 47 (Modified Potato Starch) | 0.194 |
| Salt (sodium chloride) | 0.010 |
| Essential Soft ™ 1500 | 0.099 |
| Ban 800 MG ™ | 0.001 |
| Glycerine | 1.00 |
| Total | 100.00 |

The dry mix is prepared as described in Example 1 and donuts are also prepared from this dry mix according to the procedure of Example 1. The resultant donuts have improved moisture content, mouthfeel, texture, and prolonged shelf-life, including resistance to staling, as compared to an otherwise identical donut prepared in the absence of glycerine.

The donuts also have an improved resistance to staling and/or moisture loss as compared to the donuts of Example 1 due to the presence of the additional anti-staling ingredients, in particular the α-amylase enzyme, the maltogenic amylase enzyme, the combination of xanthan and guar gums, and the modified potato starch (a pregelatinized cross-linked acetylated potato starch).

Example 3

A dry mix for preparing a cake donut having an extended shelf life and/or improved moisture content and/or improved organoleptic attributes is provided in Table 3.

TABLE 3

| Ingredient | Weight % |
| --- | --- |
| Cake Flour | 40.79 |
| Bread Flour | 21.99 |
| Granulated Sugar | 21.41 |
| Soybean Oil | 3.06 |
| Nonfat Dry Milk | 2.55 |
| Dried Egg Yolk | 2.04 |
| Soy Flour | 2.04 |
| Salt (sodium chloride) | 1.02 |
| Sodium Bicarbonate | 1.02 |
| Gelatinized Wheat Starch | 0.81 |
| Sodium Acid Pyrophosphate | 1.23 |
| Glycerine | 2.04 |
| Total | 100.00 |

The dry mix is prepared according to the procedure of Example 1. Despite the higher amount of glycerine used in this example, the dry mix is free of clumps and caking and has powder flow characteristics that are visually indistinguishable from an otherwise identical dry mix that does not contain glycerine, including a lack of cohesion when squeezed with the hand and a return to loose particulate form when the hand is opened.

Water is then added to a mixing bowl containing the donut dry mix and mixed to form a batter. The batter is allowed to rest in the mixing bowl for about 10 minutes (Floor Time).

The batter is deposited in a fryer containing oil at a temperature of about 385° F. and fried for 45 to 60 seconds. The pieces are flipped and fried for an additional 45 to 60 seconds and then removed from the oil (total time to exit=about 90 second to about 120 seconds). The exiting donut has an internal temperature of about 202° F. to about 210° F. The donuts are air cooled to provide the finished product.

The resultant donuts have improved moisture content, mouthfeel, texture, and prolonged shelf-life, including resistance to staling, as compared to otherwise identical donuts prepared in the absence of glycerine.

Example 4

A dry mix for preparing a cake donut having an extended shelf life and/or improved moisture content and/or improved organoleptic attributes is provided in Table 4.

TABLE 4

| Ingredient | Weight % |
|---|---|
| Cake Donut Mix | |
| Cake Flour | 40.00 |
| Bread Flour | 21.57 |
| Granulated Sugar | 21.00 |
| Soybean Oil | 3.00 |
| Nonfat Dry Milk | 2.50 |
| Dried Egg Yolk | 2.00 |
| Soy Flour | 2.00 |
| Salt (sodium chloride) | 1.00 |
| Sodium Bicarbonate | 1.00 |
| Gel Wheat Starch | 0.80 |
| Sapp 28 (Sodium Acid Pyrophosphate) | 1.20 |
| Anti-Staling Additive | |
| Cake Flour | 1.285 |
| Starplex ™ 90 (Monoglyceride) | 0.135 |
| Granulated Sugar | 0.129 |
| Sodium Stearoyl Lactylate (SSL) | 0.026 |
| Guar gum | 0.027 |
| Xanthan gum | 0.027 |
| Pen Plus ™ 47 (Modified Potato Starch) | 0.193 |
| Salt (sodium chloride) | 0.010 |
| Essential Soft ™ 1500 | 0.092 |
| Ban ™ 800 MG | 0.001 |
| Glycerine | 2.00 |
| Total | 100.00 |

The dry mix is prepared according to the procedure of Example 1 and has identical handling properties (flow, clumping, caking, etc.) as the dry mix of Example 3, indicating that the presence of the additional anti-staling ingredients does not adversely impact those properties of the mix.

Cake donuts are also prepared from this dry mix according to the procedure of Example 3. The resultant donuts have improved moisture content, mouthfeel, texture, and prolonged shelf-life, including resistance to staling, as compared to otherwise identical cake donuts prepared in the absence of glycerine. The donuts also have an improved resistance to staling and/or moisture loss as compared to the donuts of Example 3 due to the presence of the additional anti-staling ingredients, in particular the α-amylase enzyme, the maltogenic amylase enzyme, the combination of xanthan and guar gums, and the modified potato starch (a pregelatinized cross-linked acetylated potato starch).

Example 5

A dry mix for preparing biscuits having a prolonged shelf life and/or improved moisture retention and/or improved organoleptic attributes is provided in Table 5.

TABLE 5

| Ingredient | Weight % |
|---|---|
| Pastry Flour | 39.22 |
| Patent Flour | 39.22 |
| Vegetable Oil | 13.73 |
| Salt | 1.96 |
| Sodium Bicarbonate | 1.76 |
| Leavening Acids | 2.16 |
| Glycerine | 1.95 |
| Total | 100.00 |

The dry mix is prepared according to the procedure of Example 1.

The dry mix is formed into a dough and baked according to customary methods. The resulting biscuits have improved organoleptic attributes, moisture retention, and/or resistance to staling as compared to otherwise identical biscuits prepared in the absence of glycerine.

Example 6

A dry mix for a biscuit having improved moisture retention, prolonged shelf life, and/or resistance to staling and/or improved organoleptic attributes and/or improved moisture content is provided in Table 6.

TABLE 6

| Ingredient | Weight % |
|---|---|
| Biscuit Mix | |
| Pastry Flour | 36.10 |
| Patent Flour | 36.10 |
| Vegetable Oil | 12.63 |
| Salt | 1.81 |
| Sodium Bicarbonate | 1.62 |
| Leavening Acids | 1.99 |
| Anti-Staling Additive | |
| Buttermilk Flavor | 0.159 |
| Guar Gum | 0.048 |
| Xanthan Gum | 0.048 |
| Sweet Dairy Whey | 1.32 |
| Buttermilk Powder | 2.79 |
| Essential Soft ™ 1500 | 0.032 |
| Modified Potato Starch | 0.604 |
| Salt (sodium chloride) | 0.040 |
| Monoglyceride | 0.239 |
| Non Fat Dry Milk Powder | 1.35 |
| Acid Whey | 1.32 |
| Glycerine | 1.80 |
| Total | 100.00 |

The dry mix is prepared according to the procedure of Example 1.

The dry mix is formed into a dough and baked according to the identical method of Example 6. The resulting biscuits have improved organoleptic attributes, moisture retention, and/or resistance to staling as compared to otherwise identical biscuits prepared in the absence of glycerine and improved shelf life, and anti-staling attributes as compared to the biscuits of Example 6.

Example 7

A dry mix for preparing a white bread having improved moisture retention and/or prolonged shelf life and/or improved organoleptic attributes is provided in Table 7.

TABLE 7

| Ingredient | Weight % |
|---|---|
| Patent Flour | 64.14 |
| Yeast | 5.19 |
| Vital Wheat Gluten | 11.32 |
| Monoglycerides | 1.52 |
| HFCS | 4.53 |
| Brown Sugar | 4.53 |
| Whey Protein Isolate - 90% | 1.89 |
| Soybean Oil | 3.02 |
| Salt | 1.89 |
| Ascorbic Acid | 0.02 |
| Glycerine | 1.95 |
| Total | 100.00 |

The dry mix is prepared according to the method of Example 1.

The dry mix is formed into dough using the straight dough method and baked according to customary practice. The resulting bread product has improved moisture retention and/or resistance to staling as compared to an otherwise identical bread prepared in the absence of glycerine.

The invention having been described by the forgoing description of the preferred embodiment, it will be understood that the skilled artisan may make modifications and variations of these embodiments without departing from the spirit or scope of the invention as set forth in the following claims.

All patent and non-patent literature discussed above is hereby incorporated by reference in its entirety for all purposes.

The invention claimed is:

1. A process for preparing a dry mix of food ingredients comprising spraying an atomized liquid comprising glycerine onto an agitated mass of food ingredients in particulate form to form a dry mix having from 0.1% to about 3.0% by weight glycerine homogeneously dispersed thereon, said food ingredients comprising from 10% to 99.9% by weight flour, and said liquid having a water activity ($a_w$) less than 0.35 and comprising at least 50% by weight glycerine, from 0% to less than 5% by weight of a polysorbate emulsifier based on the weight of glycerine, said dry mix having a moisture content less than 15% by weight and a water activity of less than 0.91, and flow properties and resistance to clumping substantially the same as the flow properties and resistance to clumping of an otherwise identical dry mix in the absence of said glycerine.

2. A process for preparing a dry mix of food ingredients comprising:

(i) spraying an atomized liquid comprising glycerine onto an agitated mass of flour to homogeneously disperse glycerine thereon, said liquid having a water activity ($a_w$) less than 0.35, and comprising at least 50% by weight glycerine and from 0% to less than 5% by weight of a polysorbate emulsifier based on the weight of glycerine, and (ii) forming a dry mix by combining said flour having glycerine homogeneously dispersed thereon with additional food ingredients, wherein the amount of additional food ingredients is sufficient to bring the total flour content of said dry mix to 40% to 99.9% by weight of said dry mix, and the glycerine content from about 0.1% to about 3.0% by weight of said dry mix, said dry mix having a moisture content less than 15% by weight and a water activity of less than 0.91, and flow properties and resistance to clumping substantially the same as the flow properties and resistance to clumping of an otherwise identical dry mix in the absence of said glycerine.

3. The process according to claim 1, wherein said liquid further comprises an oil.

4. The process according to claim 1, wherein said dry mix is free of shortening.

5. The process according to claim 1, wherein said flour comprises from 60% to 70% by weight of said dry mix.

6. The process according to claim 1, wherein said flour comprises from 70% to 80% by weight of said dry mix.

7. The process according to claim 1, wherein said flour comprises from 80% to 90% by weight of said dry mix.

8. The process according to claim 1, wherein said glycerine comprises from 1.0% to 1.25% by weight of said dry mix.

9. The process according to claim 1, wherein said glycerine comprises from 1.25% to 1.5% by weight of said dry mix.

10. The process according to claim 1, wherein said glycerine comprises from 1.5% to 1.75% by weight of said dry mix.

11. The process according to claim 1, wherein said glycerine comprises from 1.75% to 2.0% by weight of said dry mix.

12. The process according to claim 1, wherein said glycerine comprises from 2.0% to 2.25% by weight of said dry mix.

13. The process according to claim 1, wherein said glycerine comprises from 2.25% to 2.5% by weight of said dry mix.

14. The process according to claim 1, wherein said glycerine comprises from 2.5% to 2.75% by weight of said dry mix.

15. The process according to claim 1, wherein said glycerine comprises from 2.75% to 3.0% by weight of said dry mix.

16. The process according to claim 1, wherein said dry mix comprises a leavening agent.

17. The process according to claim 1, wherein the flow properties of said dry mix are within ±10% of the same value measured for an otherwise identical dry mix in the absence of glycerine.

18. The process according to claim 1, wherein the flow properties of said dry mix are within ±5% of the same value measured for an otherwise identical dry mix in the absence of glycerine.

19. The process according to claim 1, wherein said liquid is free of diluents.

20. The process according to claim 1, wherein dry mix has a moisture content of less than about 12% by weight.

* * * * *